(12) United States Patent
Fraser et al.

(10) Patent No.: US 7,381,384 B2
(45) Date of Patent: Jun. 3, 2008

(54) INSULATING INSERTS FOR ELEVATED TEMPERATURE PROCESS VESSELS

(75) Inventors: Kevin S. Fraser, Mississauga (CA); Patrick Henry Lauzon, Burlington (CA); Arthur W Cooper, Mississauga (CA); Albert J. Koning, Stoney Creek (CA)

(73) Assignee: Hatch Ltd., Mississauga, Ontario (CA)

( * ) Notice: Subject to any disclaimer, the term of this patent is extended or adjusted under 35 U.S.C. 154(b) by 486 days.

(21) Appl. No.: 10/487,285

(22) PCT Filed: Aug. 9, 2002

(86) PCT No.: PCT/CA02/01243

§ 371 (c)(1),
(2), (4) Date: Apr. 14, 2005

(87) PCT Pub. No.: WO2004/014545

PCT Pub. Date: Feb. 19, 2004

(65) Prior Publication Data

US 2005/0180902 A1    Aug. 18, 2005

(51) Int. Cl.
*B01J 19/00* (2006.01)
*B01J 29/70* (2006.01)
*F28D 21/00* (2006.01)
*C10G 7/10* (2006.01)
*B01D 3/00* (2006.01)

(52) U.S. Cl. ............... 422/241; 422/207; 422/240; 208/46; 208/47; 202/81

(58) Field of Classification Search ............... 422/241, 422/207, 240; 55/435; 208/46, 47; 202/81
See application file for complete search history.

(56) References Cited

U.S. PATENT DOCUMENTS 1,888,039 A * 11/1932 Huff ............... 138/147
2,116,748 A * 5/1938 Carter ............ 261/118
2,406,640 A * 8/1946 Siecke ............ 208/165

(Continued)

FOREIGN PATENT DOCUMENTS

DE    30 48 191 A1    12/1980

OTHER PUBLICATIONS

Translation of German reference dated Dec. 19, 1980.

(Continued)

*Primary Examiner*—Walter D. Griffin
*Assistant Examiner*—Huy-Tram Nguyen
(74) *Attorney, Agent, or Firm*—Kirkpatrick & Lockhart Preston Gates Ellis LLP

(57) ABSTRACT

Insulating members are provided for use in nozzles of elevated temperature process vessels employing a structural metal shell (24), an insulating refractory lining (14) and a corrosion-resistant membrane (18) lining between the structural shell and refractory lining. The insulating members comprise pre-formed insulating sleeves and inserts and are made of a thermally insulating material having sufficient thickness and sufficiently low thermal conductivity such that, when the sleeve or insert is heated by the process temperature during operation of the vessel, the thermal energy transmitted through the sleeve or insert to the membrane is insufficient to raise the temperature of the membrane above a target temperature. The most preferred thermally insulating materials are fluoropolymers such as poly (tetrafluoroethylene) flouropolymer resins.

23 Claims, 4 Drawing Sheets

U.S. PATENT DOCUMENTS

| | | | |
|---|---|---|---|
| 2,725,159 A * | 11/1955 | Sanford | 220/62.15 |
| 3,010,601 A * | 11/1961 | Holtz | 220/62.15 |
| 3,048,481 A * | 8/1962 | Eastman | 264/30 |
| 3,148,896 A * | 9/1964 | Chu | 285/55 |
| 3,227,527 A * | 1/1966 | Heinze et al. | 422/207 |
| 3,268,296 A * | 8/1966 | Hall et al. | 423/210 |
| 3,273,320 A * | 9/1966 | Delaune et al. | 55/434.1 |
| 3,354,913 A * | 11/1967 | Goto | 138/147 |
| 3,432,381 A * | 3/1969 | Collins, Jr. | 162/152 |
| 3,589,403 A * | 6/1971 | Chase | 138/137 |
| 3,651,558 A * | 3/1972 | Chase | 29/402.13 |
| 3,888,955 A * | 6/1975 | Maruko | 261/99 |
| 3,913,775 A * | 10/1975 | Ozaki | 220/560.05 |
| 4,552,727 A * | 11/1985 | Schuchardt et al. | 422/241 |
| 5,591,415 A * | 1/1997 | Dassel et al. | 422/241 |
| 6,780,277 B2 * | 8/2004 | Yokomizo et al. | 156/345.11 |
| 2002/0149074 A1* | 10/2002 | Imaeda | 257/432 |

OTHER PUBLICATIONS

PCT International Search Report issued Apr. 16, 2003.

* cited by examiner

INSULATING INSERTS FOR ELEVATED TEMPERATURE PROCESS VESSELS

CROSS-REFERENCE TO RELATED APPLICATIONS

This application is a U.S. national stage application of International Application No. PCT/CA2002/001243, filed Aug. 9, 2002, having an International Publication Number of WO/2004/014545 and an International Publication Date of Feb. 19, 2004.

FIELD OF THE INVENTION

The invention relates to the structure of nozzles for elevated temperature process vessels, and particularly to the use of thermally insulating structures for use in nozzles of such vessels.

BACKGROUND OF THE INVENTION

Process vessels operating at elevated temperatures and containing corrosive fluids are used in several industries, including pressure reaction and letdown vessels such as autoclaves, heater vessels and flash vessels in hydrometallurgical processes extracting metal values from ores, concentrates and slags.

These vessels typically employ a structural metal shell, a refractory lining and a corrosion-resistant membrane lining between the structural shell and refractory lining. The membrane protects the structural shell from corrosion by process fluids such as high temperature acid, and the refractory lining protects the membrane from the elevated temperatures inside the vessel. The design of the refractory lining is intended to limit the temperature of the corrosion-resistant membrane to a target temperature, for example to protect the membrane by limiting its temperature to its maximum allowable service temperature. In a typical example, the membrane may be lead and the refractory lining may be insulating brick. A typical membrane may have a maximum allowable service temperature on the order of about 80° C. to 120° C.

This lining system works well for the body of the process vessel, but at the nozzles which connect the vessel to the process piping there can be insufficient space to include a sufficiently insulating thickness of the refractory lining inside the nozzle, which can result in the membrane being subjected to unacceptably high temperatures. If it is discovered that membrane temperatures are unacceptably high, then additional insulation must be retrofit into the nozzle.

Another problem in insulating the corrosion-resistant membrane from elevated process temperatures is that the heat can travel around the refractory lining, by conduction through the cover and nozzle flange, and so to the membrane via the steel shell.

Metallic sleeves and inserts have been used in the past, made of a wide variety of materials, including stainless steel, duplex and super-duplex stainless steels and titanium. These materials, while resistant to corrosive attack under various conditions, are deficient in thermal insulating properties.

There have also been instances where a polymeric resin, typically furan resin, has been poured between a metallic sleeve and the refractory lining of a nozzle to provide insulating value. However, these polymers have a limited service temperature above which they degrade, and it has been found that these insulating layers adhere the sleeve to the underlying refractory layer, making replacement of the sleeve difficult.

Accordingly, the need exists for more effective systems for insulating nozzles of process vessels containing corrosive fluids operating at elevated temperatures. In particular, the developing field of extracting metal values via hydrometallurgical processes requires, for some ore bodies, higher process temperatures than have previously been used. In the past, process temperatures of about 150° C. were typical. In order to process a wider range of ores, it is not uncommon for some currently used processes to operate at considerably higher temperatures and pressures, for example with the operating temperature inside the vessel being up to 300° C. Improved insulation methods are therefore required in order to maintain the membrane temperatures below an upper limiting temperature (such as the maximum allowable service temperature), by insulating it against higher process temperatures.

SUMMARY OF THE INVENTION

The present invention overcomes the difficulties of the prior art by providing pre-formed insulating sleeves and inserts for nozzles of process vessels containing corrosive fluids and operating at elevated temperatures.

In one preferred embodiment, the invention provides a pre-formed, replaceable, polymeric insulating insert which defines the inner surface of the nozzle. The insert is resistant to corrosive process fluids and elevated temperatures, and and also functions to insulate the nozzle, thereby preventing damage to the membrane lining of the nozzle.

In one aspect, the present invention provides a nozzle for a process vessel for operation at an elevated process temperature, the vessel having an outer metal shell, an inner insulating lining, and a membrane between the insulating lining and the outer shell, the nozzle having an interior communicating with an interior of the vessel and comprising: (a) a nozzle outer shell sealed to the outer shell of the vessel, the nozzle outer shell having first and second open ends, and a side wall defining a nozzle axis extending between the first and second ends of the nozzle outer shell; (b) a nozzle membrane lining an interior surface of the nozzle outer shell, the nozzle membrane being sealed to the membrane of the vessel; (c) a cover provided on the first end of the nozzle outer shell; and (d) a preformed insulating sleeve comprised of a thermally insulating material having a maximum allowable service temperature greater than an operating temperature inside the nozzle, the insulating sleeve being hollow and having a side wall having an inner surface and an outer surface, the side wall of the sleeve extending along the nozzle axis between the first and second ends of the nozzle outer shell; wherein the side wall of the insulating sleeve is of sufficient thickness and has sufficiently low thermal conductivity such that, when the insulating sleeve is heated by the process temperature during operation of the vessel, the outer surface of the side wall remains at a sufficiently low temperature such that thermal energy transmitted through said insulating sleeve to said nozzle membrane is insufficient to raise the temperature of any part of the nozzle membrane above a target temperature.

In another aspect, the present invention provides A nozzle for a process vessel for operation at elevated temperature, the vessel having an outer metal shell, an inner insulating lining, and a membrane between the insulating lining and the outer shell, the nozzle having an interior communicating with an interior of the vessel and comprising: (a) a nozzle outer shell sealed to the outer shell of the vessel, the nozzle outer shell having first and second open ends, and a side wall defining a nozzle axis extending between the first and second ends of the nozzle outer shell; (b) a nozzle membrane lining an interior surface of the nozzle outer shell, the nozzle membrane being sealed to the membrane of the vessel; (c) a cover provided on the first end of the nozzle outer shell, the cover having a first surface, a second surface supported in facing relationship to the first end of the nozzle outer shell, and an inner surface extending between the first and second surfaces of the first cover, the inner surface defining an aperture in the cover; and (d) a hollow, axial insulating member comprised of a thermally insulating material having a maximum allowable service temperature greater than an operating temperature inside the nozzle, the axial insulating member comprising a side wall having a first end, a second end, an inner surface and an outer surface, the inner surface facing an interior of the nozzle and the outer surface facing the inner surface of the cover; wherein the side wall of the axial insulating member is of sufficient thickness and has sufficiently low thermal conductivity such that, when the axial insulating member is heated by the process temperature during operation of the vessel, the outer surface of the insulating member side wall remains at a sufficiently low temperature such that thermal energy transmitted through the insulating member to the nozzle membrane is insufficient to raise the temperature of any part of the nozzle membrane above a target temperature.

BRIEF DESCRIPTION OF THE DRAWINGS

The invention will now be described, by way of example only, with reference to the accompanying drawings, in which.

DETAILED DESCRIPTION OF PREFERRED EMBODIMENTS

Preferred embodiments of the invention are now described with reference to the drawings.

Figure 1:
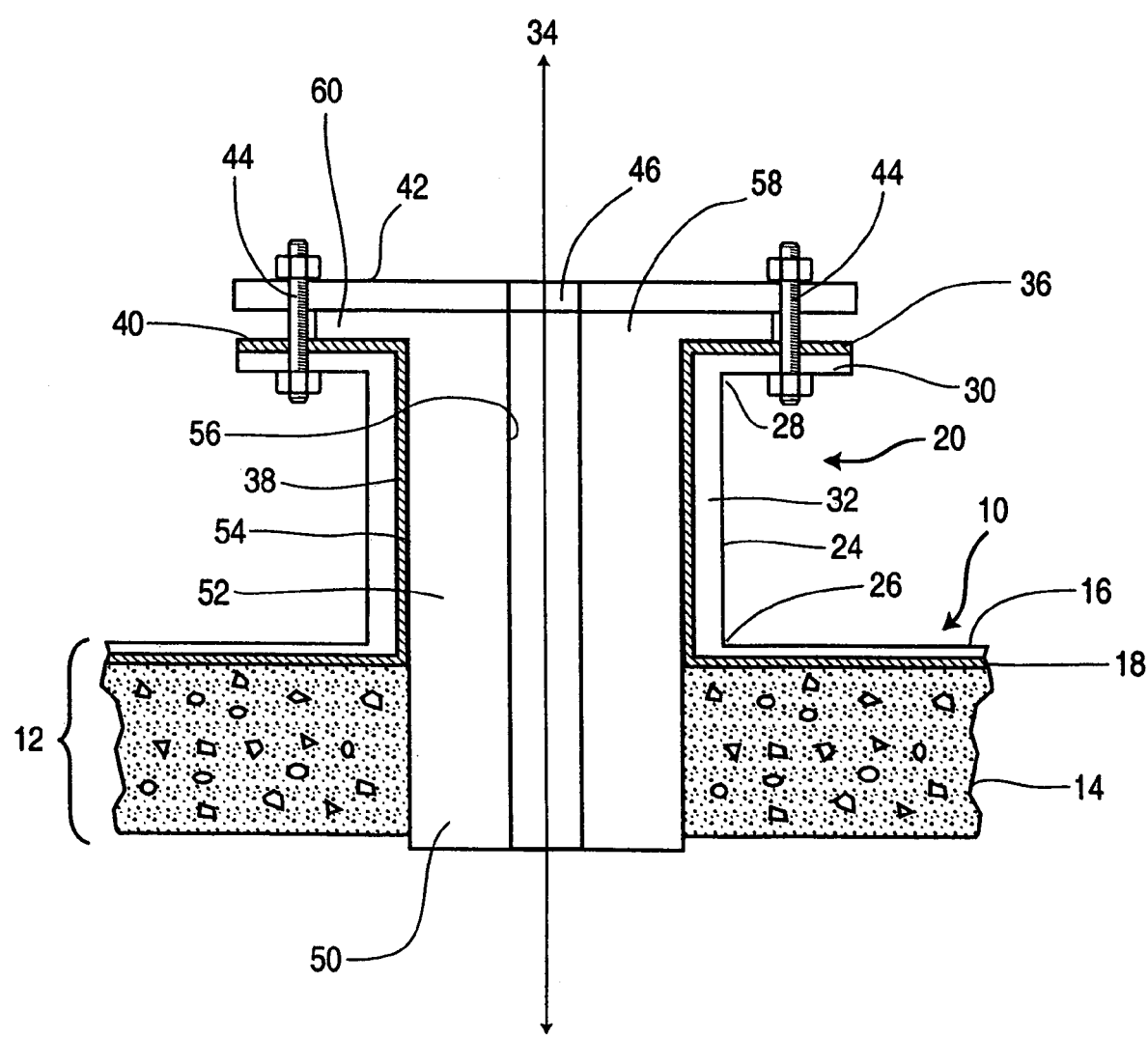
FIG. 1 is a cross-sectional view of the nozzle of an elevated temperature, high pressure process vessel incorporating an insulating sleeve according to a first preferred embodiment of the present invention.

FIG. 1 illustrates a portion of an elevated temperature, high pressure process vessel 10 which may preferably comprise an autoclave, a heater vessel or a flash vessel. Vessel 10 is preferably used in a hydrometallurgical process such as pressure acid leach (PAL) or a pressure oxidation leach (POX), to extract metal values from ore. The vessel 10 has a shell 12 comprised of a plurality of layers, including an inner refractory lining 14, an outer metal shell 16, and a membrane 18 between the refractory lining 14 and outer shell 16. Although not shown in FIG. 1, it will also be appreciated that the refractory lining 14 is preferably made up of layers of individual refractory bricks, with the joints between bricks being filled with mortar.

The membrane 18 is preferably comprised of a flexible or malleable material, typically comprising a layer of rubber, vinyl ester, furan, phenolic resin, lead or other corrosion resistant material. The membrane 18 protects the outer shell 16 from contact with the corrosive process fluid inside vessel 10. The outer metal shell 16 contains the pressure inside the vessel 10, and is typically made of a metal such as carbon steel, which is susceptible to corrosive attack.

The vessel 10 is provided with a nozzle 20 which connects the interior of vessel 10 to process piping (not shown), and through which the vessel 10 may be charged or discharged. It will be appreciated that a plurality of nozzles will preferably be provided in the shell of vessel 10. It will also be appreciated that some nozzles do not meet the process vessel at a right angle, and also that while some nozzles project upward, others project at different angles including sideways or downward.

The nozzle 20 has an outer shell 24 which projects outwardly from the outer shell 16 of vessel 10. The nozzle outer shell 24 has a lower end 26 which is sealed to the outer shell 16 of vessel 10, an upper end 28 provided with a radially outwardly extending flange 30, and a side wall 32 extending between the lower and upper ends 26,28 of nozzle outer shell 24, the nozzle side wall 32 defining a nozzle axis 34.

The lower open end 26 of nozzle outer shell 24 is preferably secured to the metal shell 16 of vessel 10 by welding or the like, and is preferably formed from the same material as metal shell 16.

The nozzle 20 preferably has a circular cross-section, with the side wall 32 of nozzle outer shell 24 preferably being cylindrical, and flange 30 preferably being annular.

The nozzle further comprises a nozzle membrane 36 which lines an interior surface 38 of the nozzle outer shell 24. The nozzle membrane is sealed to the membrane 18 of vessel 10 so as to form a continuous membrane layer to protect outer shells 16,24 of vessel 10 and nozzle 20. More preferably, the nozzle membrane 36 is integrally formed with membrane 18, and is comprised of the same material.

As shown in FIG. 1, the nozzle membrane 36 protects all surfaces of the nozzle outer shell 24 from contact with the nozzle interior, and may preferably extend over an upper surface 40 of flange 30 as shown in FIG. 1.

The nozzle 20 further comprises a cover 42 which is bolted to the flange 30 via a plurality of studs 44 passing through apertures in the cover 42 and flange 30. The cover 42 is either made of a corrosion-resistant alloy or has a protective cladding applied to it on the surfaces exposed to the process. The cladding is usually metallic and may be a distinct material from the material used for the vessel membrane. The cover 42 has a central opening 46 through which materials may be charged into or discharged from vessel 10, and may preferably be secured about its perimeter to the flange of process piping (not shown). It will be appreciated that cover 42 may not necessarily have a central opening, for example where it is desired to provide a "blind" flange to completely close the nozzle.

The nozzle 20 further comprises a pre-formed insulating sleeve 50 according to the present invention. Sleeve 50 is comprised of a polymeric material having a maximum allowable service temperature greater than an operating temperature inside the nozzle. The insulating sleeve 50 is hollow, having a side wall 52 which is preferably cylindrical in shape. The side wall 52 extends along the nozzle axis 34 between the lower and upper ends 26,28 of the nozzle outer shell 24 and, as shown in FIG. 1, preferably extends completely through the shell 12 of vessel 10.

The side wall 52 of insulating sleeve 50 has an outer surface 54 and an inner surface 56. The inner surface 56 may, as shown in FIG. 1, define an inner surface of the nozzle 20. The inner surface 56 of the sleeve 50 may be in direct contact with the nozzle interior, and with the process fluids inside the vessel 10 or, alternatively, the nozzle 20 may be provided with a dip pipe (not shown) extending through the insulating sleeve 50 and defining the inner surface of nozzle 20. The polymeric material comprising the insulating sleeve is preferably chemically resistant, and more particularly is highly resistant to elevated temperature and corrosive process fluids, such that the sleeve 50 is not corroded over a prolonged period of exposure.

The insulating sleeve 50 provided in nozzle 20 accordingly has several functions. As mentioned above, it may form an inner protective lining of nozzle 20 which is highly resistant to high temperatures and corrosive attack. Furthermore, the sleeve 50 has insulating properties which prevent damage to the nozzle membrane 36 from elevated temperature, the nozzle membrane 36 being in direct contact with the outer surface 54 of insulating sleeve 50 in the embodiment of FIG. 1. In order to ensure that the nozzle membrane 36 is adequately protected, the side wall 52 of the insulating sleeve 50 is of sufficient thickness, and the polymeric material comprising sleeve 50 has sufficiently low thermal conductivity such that, when the inner surface 56 of the side wall 52 is exposed to the operating temperatures inside nozzle 20, the outer surface 54 of side wall 52 remains at a sufficiently low temperature that nozzle membrane 36 is maintained at a temperature below a target temperature, which may be its maximum allowable service temperature.

The inventors have found that a suitable polymeric material possessing high resistance to temperature and corrosive process fluids, and having low thermal conductivity, are the class of compounds known as fluoropolymers. The fluoropolymer may or may not be reinforced by a fibrous material such as glass fibres.

The most preferred fluoropolymers for use in the insulating sleeve 50 are those known as poly(tetrafluoroethylene) fluoropolymer resins, also known as PTFE. PTFE is reported by one manufacturer to have an average thermal conductivity of 1.7±0.3 Watts per metre-Kelvin a temperature range of 20 to 260° C. Further, PTFE will not melt at temperatures encountered in the nozzle interior, as PTFE resins are useful at temperatures of at least about 260° C., and do not become gel until they reach a temperature of about 327° C. Furthermore, PTFE fluoropolymer resins are essentially inert to chemical attack, in particular by acids, even at high temperature.

It will be appreciated that PTFE fluoropolymer resins are particularly preferred for use in the present invention for elevated temperature applications where other polymers would be exposed to temperatures above their maximum service temperature or would not have sufficient insulating value. In addition to its resistance to high temperatures and hostile environments, the use of PTFE, by virtue of its low friction coefficient, offers the added benefit of making the insert easier to remove in one piece when disassembling the nozzle during maintenance activities. It will also be appreciated that other polymers exist which have high resistance to chemical attack and low thermal conductivity and which may be useful at lower operating temperatures, and that materials other than polymers may be used under other conditions.

The preferred structure of insulating sleeve 50 is now discussed below in more detail.

The insulating sleeve 50 has an upper end 58 which is provided with a radially outwardly extending flange 60 which is preferably formed from the same polymeric material as the side wall 52. Preferably, the flange 60 is annular in shape. The flange 60 serves to retain the sleeve 50 in place, being received between the flange 30 of nozzle outer shell 24 and the cover 42, and preferably forming at least a partial seal between the flange 30 and cover 42. The flange 60 also serves to further insulate the nozzle membrane 36, and specifically protects the portion of membrane 36 which extends over the upper surface 40 of the flange 30. Furthermore, the flange 60 creates a partial thermal break between the cover 42 and the flange 30 of nozzle outer shell 24, reducing the amount of heat which is transferred to the nozzle membrane 36 through the cover 42. Of course, some heat is transferred between cover 42 and flange 30 through studs 44. However, the inventors have found that the system can be designed such that this heat transfer is insufficient to cause damage to the nozzle membrane 36.

In the preferred embodiment shown in FIG. 1, the side wall 52 of sleeve 50 is comprised of a single layer of material. It will however be appreciated that the side wall may instead comprise two or more nested layers. The thickness of the side wall will of course vary depending on the insulating value required. A typical insulating sleeve according to the invention will have a side wall about 0.5 to 6 inches thick. It will be appreciated that the wall thickness of sleeve 50 is not shown to scale in FIG. 1.

Figure 4A:
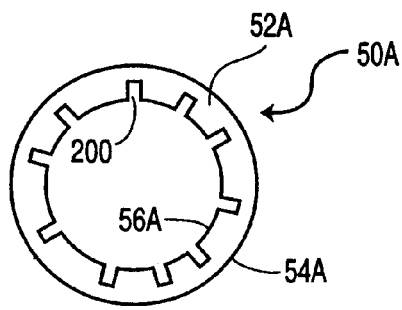
FIGS. 4A to 4F are radial cross-sectional views through a preferred insulating sleeve according to the invention having means for accommodating thermal expansion.
Figure 4B:
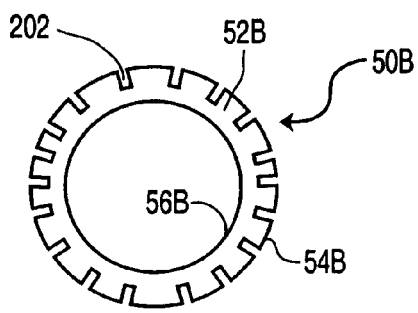
Figure 4C:
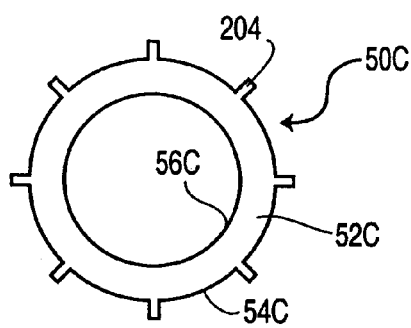
Figure 4D:
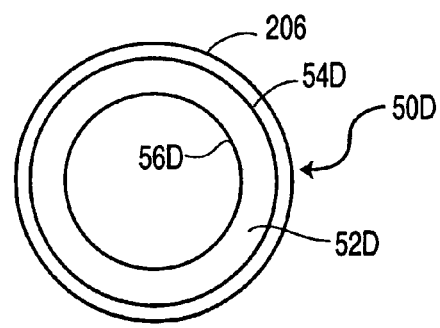
Figure 4E:
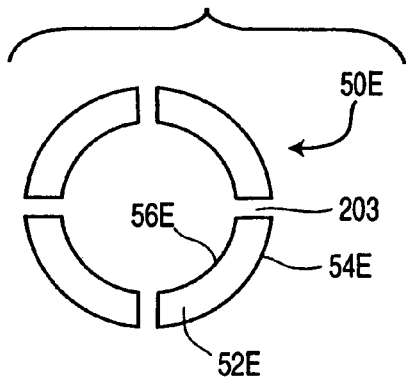
Figure 4F:
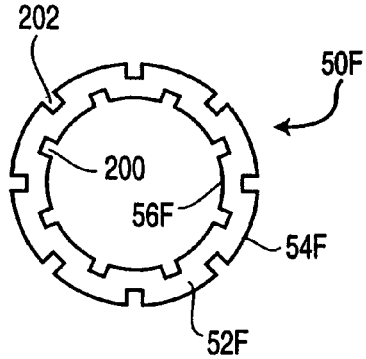

In using polymeric materials such as PTFE at elevated temperatures, care must be taken to allow for the thermal expansion of the polymeric material. For example, a PTFE sleeve can expand by as much as 20 percent at high operating temperatures. It is one of the design requirements that the insert, which can exert considerable stress if constrained during expansion, be allowed to expand without causing stress and damage to the surrounding components in the nozzle. This can be achieved, for example, as shown in FIGS. 4A and 4B, by creating grooves 200 or 202 extending radially into the inner surface, the outer surface, or both the inner and outer surfaces (as shown in FIG. 4F), of the side wall of the sleeve and extending partway therethrough, which close up with the thermal expansion of the PTFE, or by otherwise allowing room for expansion. Alternatively, the same effect may be attained by providing slots 203 which extend radially through the entire thickness of the side wall, as shown in FIG. 4E, or by providing radially outwardly extending ribs 204 on the outer surface of the sleeve as shown in FIG. 4C. It will be appreciated that the grooves, slots and/or ribs may extend axially along the sleeve side wall, and may preferably extend along the nozzle axis, in a spiral along the sleeve side wall, or two sets of spiral grooves may be run in a crosshatch pattern. In another alternative arrangement, a layer of compressible material may be provided adjacent to, or in the vicinity of, one or more surfaces of the sleeve. For example, the outer surface of the sleeve may be provided with a layer 206 of a compressible material as shown in FIG. 4D. It will be appreciated that a layer of compressible material may also be provided adjacent to the flanges of sleeves according to the invention. The compressible material may preferably comprise an expanded polymeric packing, and may preferably be comprised of PTFE. With care, allowance for expansion of the sleeve can be made without compromising its insulating effectiveness.

Figure 2:
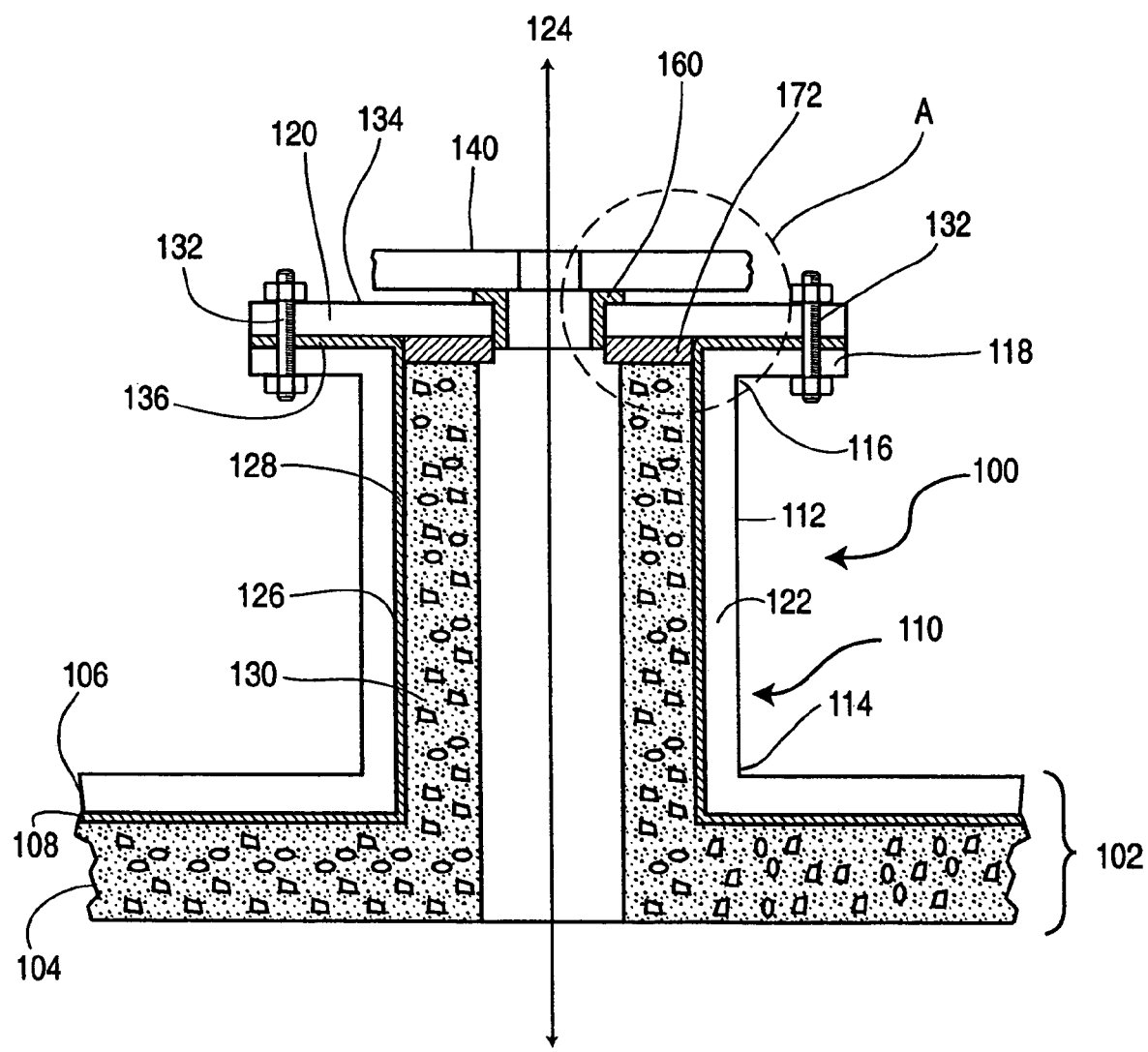
FIG. 2 is a cross-sectional view through the nozzle of an elevated temperature, high pressure process vessel incorporating an insulating sleeve according to a second preferred embodiment of the present invention.
Figure 3:
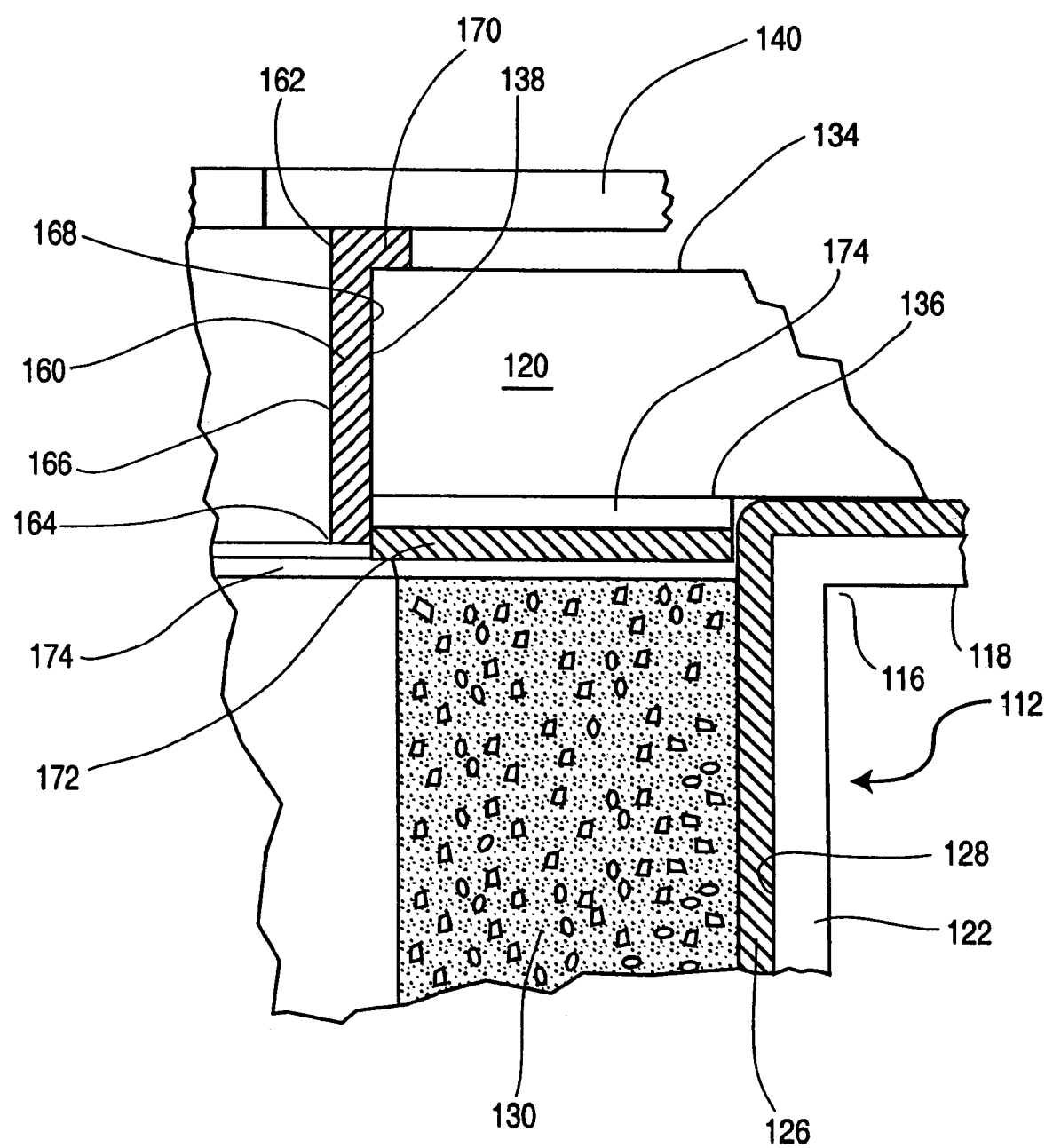
FIG. 3 is a closeup of area A in FIG. 2.

Although the nozzle 20 illustrated in FIG. 1 does not have a refractory lining, it will be appreciated that the nozzle 20 may preferably be provided with a lining of refractory brick, similar to that shown in FIGS. 2 and 3, in between the nozzle membrane 36 and the outer surface 54 of the insulating sleeve 50. In a retrofit situation, where the membrane temperatures are found to be unacceptably high, or above the target temperature, and there is insufficient room in the nozzle to install refractory while keeping the necessary open inner process diameter, installation of the insulating sleeves according to this embodiment of the invention can provide the necessary solution to the problem. It will also be appreciated that the refractory lining of the nozzle or of the vessel may be recessed to receive the insulating sleeves, as an alternative or in addition to the flange 60, to assist in retaining the insulating sleeve 50 in place.

FIGS. 2 and 3 illustrate a second preferred embodiment of the present invention, in which a plurality of polymeric insulating members are provided to insulate a nozzle membrane against damage due to overheating by way of thermal conduction through the vessel nozzle cover.

FIG. 2 illustrates a portion of an elevated temperature, high pressure process vessel 100 having a shell 102 comprised of an inner refractory lining 104, an outer metal shell 106 and a membrane 108 received between the refractory lining 104 and the outer shell 106. As in the embodiment of FIG. 1, the membrane 108 is comprised of a malleable or flexible material which protects the outer metal shell 106 from contact with corrosive process fluids within the vessel 100. Also, as with the embodiment of FIG. 1, the nozzle has an interior communicating with an interior of the vessel 100.

The vessel 100 is provided with at least one nozzle, including nozzle 110 illustrated in FIG. 2. As in the embodiment of FIG. 1, nozzle 110 connects the interior of vessel 100 to process piping (not shown) through which materials are charged into or discharged from the vessel 100.

The nozzle 110 comprises a plurality of layers. An outer layer of the nozzle 110 comprises an outer shell 112 projecting outwardly from the outer shell 106 of the vessel 100. The nozzle outer shell 112 has a lower end 114 which is sealed to the outer shell 106 of vessel 100, preferably by welding. The nozzle outer shell 112 also has an upper end 116 which is provided with a radially outwardly extending flange 118 by which the nozzle outer shell 112 is secured to a cover 120. The cover 120 covers the upper end 116 of the nozzle outer shell and is secured to flange 118 by a plurality of studs 132 passing through apertures in the cover 120 and flange 118. The nozzle outer shell 112 also has a side wall 122 extending between lower and upper ends 114,116, the side wall 122 defining a nozzle axis 124.

Located inwardly of the nozzle outer shell 112, the nozzle 110 is provided with a nozzle membrane 126 lining an interior surface 128 of nozzle outer shell 112. As in the preferred embodiment of FIG. 1, the nozzle membrane 126 extends along the entire surface of the nozzle outer shell 112 which would otherwise be exposed to process fluid, and is preferably formed integrally with the membrane 108 of the vessel shell 102, preferably being formed from the same material.

Preferably, as shown in FIG. 2, the nozzle 110 also comprises a refractory layer 130 located inwardly of the nozzle membrane. The refractory lining 130 of nozzle 110 is comprised of a plurality of layers of bricks (not shown) having joints sealed by mortar, the refractory lining 130 of nozzle 110 being continuous with the refractory lining 104 of the vessel 100.

As shown in the detailed view of FIG. 3, the cover 120 has an upper surface 134, an opposite lower surface 136 and an inner surface 138 extending between the upper and lower surfaces 134,136. As shown in FIG. 3, upper and lower surfaces 134,136 extend radially outwardly, with the lower surface 136 facing the upper surface of the flange 118 of the nozzle outer shell 112. The inner surface 138 of cover 120 defines a central aperture of cover 120, which is preferably circular in cross section. The upper surface 134 of cover 120 may preferably be secured to an upper member 140 which may comprise a flange or cover member for securing process piping (not shown) or a dip pipe (not shown) to the nozzle 110.

In accordance with the invention, polymeric insulating members are provided in order to reduce the transfer of heat to the nozzle membrane 126. The refractory layer 130 of nozzle 110 will effectively insulate portions of the nozzle membrane 126 extending between the lower and upper ends 114, 116 of the nozzle outer shell 112. Accordingly, additional insulating material is not required for this portion of the nozzle membrane 126. In order to insulate the nozzle membrane 126 at the upper end 116 of nozzle 110, and in particular in the portions of nozzle membrane 126 extending upwardly and radially outwardly of the refractory lining 130 along flange 118, the present invention provides polymeric insulating inserts which may be comprised of one or more individual components.

In the embodiment shown in FIGS. 2 and 3, the polymeric insulating insert comprises a first hollow, axial insulating member 160 having an upper end 162, a lower end 164, an inner surface 166 and an outer surface 168. The inner surface 166 of axial insulating member faces the interior of nozzle 110 and the outer surface 168 of the axial insulating member faces the inner surface 138 of the cover 120, and is preferably in contact with the inner surface 138 of cover 120. Therefore, the axial insulating member reduces heat transfer into the cover 120 which could otherwise raise the temperature of the nozzle membrane 126 above the target temperature. Preferably, the upper end 162 of axial insulating member 160 is provided with a radially outwardly extending flange 170 which is clamped between the cover 120 and the upper member 140 or rests on cover 120 to retain the axial insulating member 160 against movement. The flange 170 also provides a partial thermal break to reduce transmission of heat from the upper member 140 to the cover 120.

The nozzle membrane 126 is also protected by a radial insulating member 172 extending radially outwardly of the axial insulating member 160 along the lower surface 136 of the cover 120.

The radial insulating member preferably comprises an annular ring of polymeric material which effectively reduces the transfer of heat from the refractory lining 130 to the cover 120 and nozzle membrane 126. The radial insulating member 172 and the axial insulating member 160 preferably abut one another at the corner of the lower surface 136 and inner surface 138 of cover 120, and may preferably be integrally be formed with the axial insulating member 160. In order to enhance insulating properties, and to allow for thermal expansion of insulating member 160 and other components while maintaining contact, and to preferably provide a seal, one or more layers of expanded (foamed) polymer packing 174 may preferably be provided between the cover 120 and radial insulating member 172, and at other surfaces where allowance must be made for expansion of the insert.

The polymeric material comprising the insulating members and the expanded polymer packing of the embodiment shown in FIGS. 2 and 3 is preferably the same as the insulating material of insulating sleeve 50 described above. The thicknesses of the inserts 160 and 172 are preferably selected so as to maintain the temperature of the nozzle membrane 126 below the target temperature, and also to provide the insulating members with the requisite mechanical properties to remain in place at the service temperature.

Although the present invention has been described in connection with certain preferred embodiments, it is not intended to be limited thereto. Rather, the invention is intended to include all embodiments which may fall within the scope of the following claims.

What is claimed is:

1. A nozzle for a process vessel for operation at an elevated process temperature, the vessel having an outer metal shell, an inner insulating lining, and a membrane between the insulating lining and the outer shell, the nozzle having an interior communicating with an interior of the vessel and comprising:
   (a) a nozzle outer shell sealed to the outer shell of the vessel, the nozzle outer shell having first and second open ends, and a side wall defining a nozzle axis extending between the first and second ends of the nozzle outer shell;
   (b) a nozzle membrane lining an interior surface of the nozzle outer shell, the nozzle membrane being sealed to the membrane of the vessel;
   (c) a cover provided on the first end of the nozzle outer shell; and
   (d) a pre-formed, replaceable insulating sleeve comprised of a thermally insulating polymer material having a maximum allowable service temperature greater than an operating temperature inside the nozzle, wherein the insulating sleeve is resistant to corrosive attack by corrosive process fluids, the insulating sleeve being hollow and having a side wall having an inner surface and an outer surface, the side wall of the sleeve extending along the nozzle axis between the first and second ends of the nozzle outer shell;
   wherein the side wall of the insulating sleeve is of sufficient thickness and has sufficiently low thermal conductivity such that, when the insulating sleeve is heated by the process temperature during operation of the vessel, the outer surface of the side wall remains at a sufficiently low temperature such that thermal energy transmitted through said insulating sleeve to said nozzle membrane is insufficient to raise the temperature of any part of the nozzle membrane above a target temperature.

2. The nozzle according to claim 1, wherein the insulating sleeve has first and second ends, the first end being provided with a radially outwardly extending flange formed from the thermally insulating material.

3. The nozzle according to claim 2, wherein the flange and the side wall of the insulating sleeve are integrally formed from the thermally insulating material.

4. The nozzle according to claim 2, wherein the first end of the nozzle outer shell is provided with a radially outwardly extending flange to which the cover is secured, the flange of the insulating sleeve being received between the flange of the nozzle outer shell and the cover.

5. The nozzle according to claim 4, wherein the nozzle membrane has an end portion which extends into a space between the nozzle flange and the cover, wherein the flange of the insulating sleeve is of sufficient thickness such that thermal energy transmitted from the cover to the end portion of the nozzle membrane is insufficient to raise the temperature of the end portion of the nozzle membrane above the target temperature.

6. The nozzle according to claim 1, wherein the outer surface of the insulating sleeve side wall is in direct contact with the nozzle membrane.

7. The nozzle according to claim 1, wherein the nozzle is provided with an insulating layer between the nozzle membrane and the outer layer of the insulating sleeve.

8. The nozzle according to claim 1, wherein the side wall of the insulating sleeve extends through the inner insulating lining of the vessel.

9. The nozzle according to claim 1, wherein the target temperature of the nozzle membrane is its maximum allowable service temperature.

10. The nozzle according to claim 1, wherein the thermally insulating material is reinforced by a second phase to improve its mechanical or thermal properties.

11. The nozzle according to claim 10, wherein the second phase comprises a fibrous material.

12. The nozzle according to claim 1, wherein the thermally insulating material is a fluoropolymer.

13. The nozzle according to claim 12, wherein the fluoropolymer comprises poly(tetrafluoroethylene).

14. The nozzle according to claim 1, wherein the side wall of the insulating sleeve is provided with means to accommodate thermal expansion of the sleeve.

15. The nozzle according to claim 14, wherein the means for permitting thermal expansion are selected from one or more members of the group comprising axial grooves formed in the side wall of the sleeve, axial slots through the side wall of the sleeve, axial ribs formed on the side wall of the sleeve, a layer of compressible material adjacent to or in the vicinity of the sleeve, and gaps for expansion adjacent to or in the vicinity of the sleeve.

16. The nozzle according to claim 15, wherein the compressible material comprises an expanded packing comprising the thermally insulating polymer material.

17. The nozzle according to claim 1, wherein the second end of the nozzle is closed off blind.

18. A nozzle for a process vessel for operation at elevated temperature, the vessel having an outer metal shell, an inner insulating lining, and a membrane between the insulating lining and the outer shell, the nozzle having an interior communicating with an interior of the vessel and comprising:
   (a) a nozzle outer shell sealed to the outer shell of the vessel, the nozzle outer shell having first and second open ends, and a side wall defining a nozzle axis extending between the first and second ends of the nozzle outer shell;
   (b) a nozzle membrane lining an interior surface of the nozzle outer shell, the nozzle membrane being sealed to the membrane of the vessel;
   (c) a cover provided on the first end of the nozzle outer shell, the cover having a first surface, a second surface supported in facing relationship to the first end of the nozzle outer shell, and an inner surface extending between the first and second surfaces of the first cover, the inner surface defining an aperture in the cover; and
   (d) a pre-formed, replaceable hollow, axial insulating member comprised of a thermally insulating polymer material having a maximum allowable service temperature greater than an operating temperature inside the nozzle, wherein the axial insulating member is resistant to corrosive attack by corrosive process fluids, the axial insulating member comprising a side wall having a first end, a second end, an inner surface and an outer surface, the inner surface facing an interior of the nozzle and the outer surface facing the inner surface of the cover;
   wherein the side wall of the axial insulating member is of sufficient thickness and has sufficiently low thermal conductivity such that, when the axial insulating member is heated by the process temperature during operation of the vessel, the outer surface of the insulating member side wall remains at a sufficiently low temperature such that thermal energy transmitted through the insulating member to the nozzle membrane is insufficient to raise the temperature of any part of the nozzle membrane above a target temperature.

19. The nozzle according to claim 18, further comprising:
(e) a first radial insulating member comprised of the thermally insulating polymer material having a maximum allowable service temperature greater than an operating temperature inside the nozzle, the first radial insulating member extending radially outwardly of the axial insulating member along the second surface of the cover.

20. The nozzle according to claim 18, further comprising:
(f) a second radial insulating member comprised of the thermally insulating polymer material having a maximum allowable service temperature greater than an operating temperature inside the nozzle, the second radial insulating member extending radially outwardly of the first end of the axial insulating member and being received along the first surface of the cover.

21. The nozzle according to claim 20, wherein the second radial insulating member is formed integrally with the axial insulating member.

22. The nozzle according to claim 18, wherein the first radial insulating member comprises an annular ring extending radially outwardly of the second end of the axial insulating member.

23. The nozzle according to claim 18, wherein the nozzle is provided with an insulating layer inwardly of the nozzle membrane.

* * * * *